(12) United States Patent
Ooba

(10) Patent No.: US 11,623,343 B2
(45) Date of Patent: Apr. 11, 2023

(54) CONTROLLER

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/090,947

(22) Filed: Nov. 6, 2020

(65) Prior Publication Data

US 2021/0170581 A1 Jun. 10, 2021

(30) Foreign Application Priority Data

Dec. 4, 2019 (JP) .............................. JP2019-219472

(51) Int. Cl.
*B25J 9/16* (2006.01)
*G05B 19/402* (2006.01)

(52) U.S. Cl.
CPC ........... *B25J 9/1602* (2013.01); *B25J 9/1633* (2013.01); *G05B 19/402* (2013.01); *G05B 2219/39143* (2013.01)

(58) Field of Classification Search
CPC ...... B25J 9/1602; B25J 9/1633; B25J 9/1679; G05B 19/402; G05B 2219/39143; Y02P 90/02
See application file for complete search history.

(56) References Cited

U.S. PATENT DOCUMENTS

| 4,543,639 | A | * | 9/1985 | Inaba | ............... | G05B 19/41825 |
|---|---|---|---|---|---|---|
| | | | | | | 700/249 |
| 5,150,024 | A | * | 9/1992 | Kimura | ................ | G05B 19/408 |
| | | | | | | 700/250 |
| 2003/0050734 | A1 | * | 3/2003 | Lapham | ................. | B25J 9/1697 |
| | | | | | | 700/245 |
| 2008/0009969 | A1 | * | 1/2008 | Bruemmer | ............. | G06N 3/008 |
| | | | | | | 700/245 |
| 2008/0275593 | A1 | * | 11/2008 | Johansson | ........... | B29C 45/7626 |
| | | | | | | 700/245 |
| 2009/0069939 | A1 | * | 3/2009 | Nagatsuka | ......... | G05B 19/4069 |
| | | | | | | 700/258 |
| 2010/0274385 | A1 | * | 10/2010 | Eriksson | ............ | G05B 19/4141 |
| | | | | | | 700/245 |
| 2011/0118874 | A1 | * | 5/2011 | Tanabe | ................... | B25J 9/1682 |
| | | | | | | 700/248 |
| 2013/0073079 | A1 | * | 3/2013 | Ouchi | ................... | B25J 9/1656 |
| | | | | | | 700/245 |

(Continued)

FOREIGN PATENT DOCUMENTS

JP 2004-330206 A 11/2004

*Primary Examiner* — Kidest Bahta
(74) *Attorney, Agent, or Firm* — Studebaker & Brackett PC

(57) ABSTRACT

The controller includes a program storage that stores programs specifying a plurality of operations associated with at least one operable unit; a program executor that executes the programs; an operation executor that causes the operable unit to operate according to the programs; and an operable unit manager that manages control of the programs. When a program is called from one of the programs, the operable unit manager obtains control of a group associated with the operable unit and specified in the called program, and releases control of a group other than the group associated with the operable unit and specified in the called program.

5 Claims, 5 Drawing Sheets

(56) References Cited

U.S. PATENT DOCUMENTS

| | | | |
|---|---|---|---|
| 2015/0336269 A1* | 11/2015 | Linnell | G05B 19/41815 |
| | | | 700/245 |
| 2018/0043527 A1* | 2/2018 | Koga | B65G 43/08 |
| 2018/0304464 A1* | 10/2018 | Naitou | B25J 9/1676 |
| 2018/0345494 A1* | 12/2018 | Hedlund | G05B 19/42 |

* cited by examiner

CONTROLLER

This application is based on and claims the benefit of priority from Japanese Patent Application No. 2019-219472, filed on 4 Dec. 2019, the content of which is incorporated herein by reference.

BACKGROUND OF THE INVENTION

Field of the Invention

The present invention relates to a controller.

Related Art

A technique has been proposed which enables switching between a plurality of control targets, such as a robot and a spot welding gun, within a program by using a control signal (Japanese Unexamined Patent Application, Publication No. 2004-330206).

Patent Document 1: Japanese Unexamined Patent Application, Publication No. 2004-330206

SUMMARY OF THE INVENTION

However, according to the technique disclosed in the above patent document, it is required to specify which one of the operable units is to be operated each time an operation command is received. To meet this requirement, complicated programs are designed which are time-consuming to create. In view of this background, there has been demand for a controller which can more flexibly manage programs with respect to a plurality of control targets.

A controller according to an aspect of the present disclosure includes: at least one operable unit; a program storage that stores programs specifying a plurality of operations associated with the at least one operable unit; a program executor that executes the programs; an operation executor that causes the at least one operable unit to operate according to the programs; and an operable unit manager that manages control of the programs. When a program is called from one of the programs, the operable unit manager obtains control of a group associated with the operable unit and specified in the called program, and releases control of a group other than the group associated with the operable unit and specified in the called program.

The present invention enables more flexible management of programs with respect to a plurality of control targets.

DETAILED DESCRIPTION OF THE INVENTION

Figure 1:
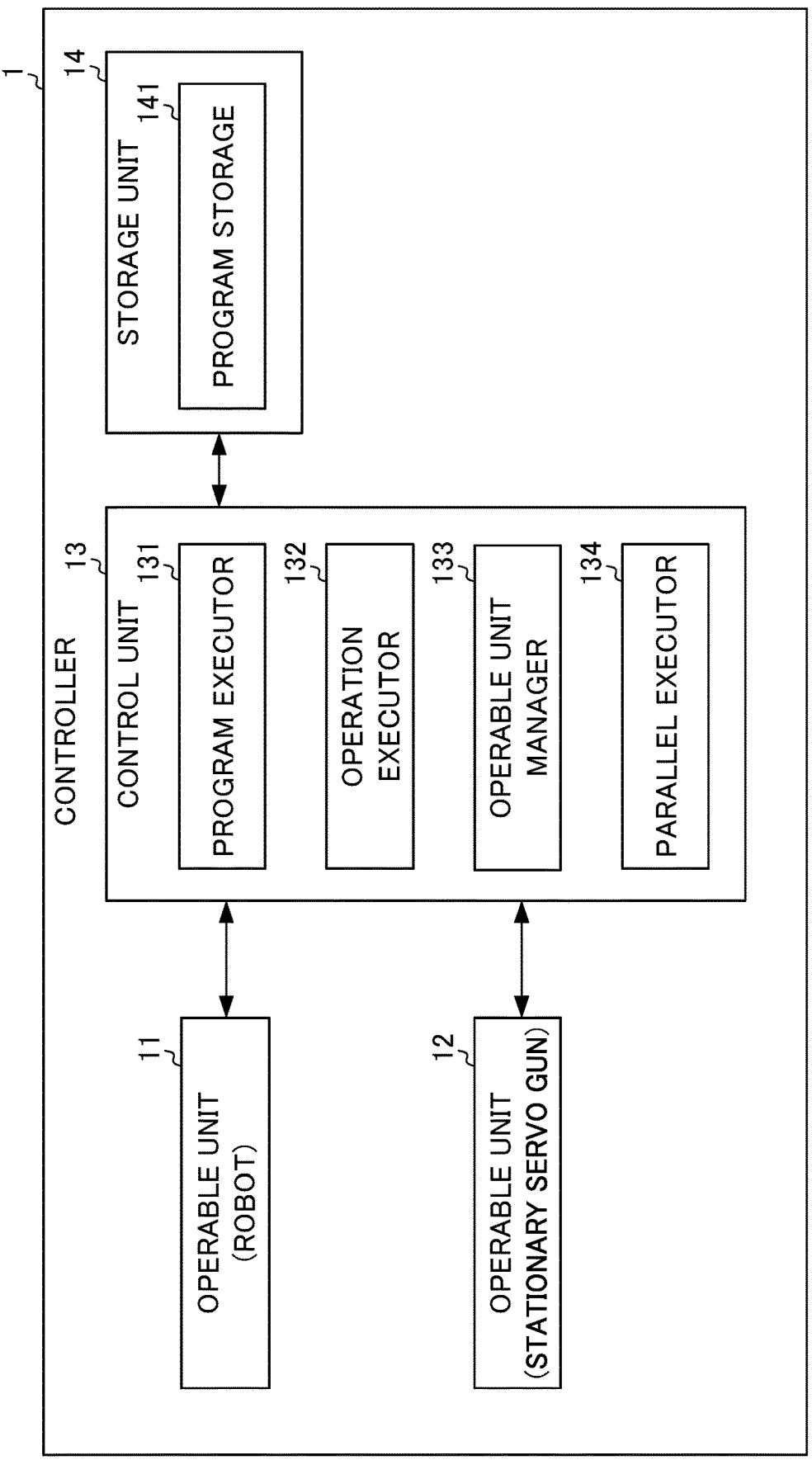
FIG. 1 is a block diagram showing functions of a controller.

An example of an embodiment of the present invention will be described below. FIG. 1 is a block diagram showing functions of a controller 1 according to the present embodiment. The controller 1 is configured to operate a robot 11 as an operable unit and a stationary servo gun 12 as an operable unit in accordance with programs.

As shown in FIG. 1, the controller 1 includes the robot 11 as an operable unit, the stationary servo gun 12 as an operable unit, a control unit 13, and a storage unit 14. The operable units 11 and 12 are operated according to the programs stored in the storage unit 14.

For example, the operable unit (robot) 11 is an articulated robot, and grasps a workpiece and conveys it to a predetermined position. The operable unit (stationary servo gun) 12 spot welds the workpiece. After welding the workpiece, the stationary servo gun 12 measures the wear amount of the tip thereof.

The control unit 13 is constituted by a processor such as a central processing unit (CPU), and executes the programs stored in the storage unit 14 so as to function as a program executor 131, an operation executor 132, an operable unit manager 133, and a parallel executor 134.

The storage unit 14 is a storage device composed of, for example, a read only memory (RPM) and a random access memory (RAM) that store an operating system (OS) and application programs, and a hard disk drive and a solid state drive (SSD) that store various kinds of other information. The storage unit 14 includes a program storage 141 that stores programs specifying a plurality of operations associated with the operable units.

The program executor 131 executes a main program and subprograms that are stored in the program storage 141. The operation executor 132 causes the operable units 11 and 12 to operate, according to the main program and the subprograms.

The operable unit manager 133 manages control of the main program and control of the subprograms. The parallel executor 134 executes the program in parallel, the program specifying a group associated with the operable unit and released by the operable unit manager 133.

Figure 2A:
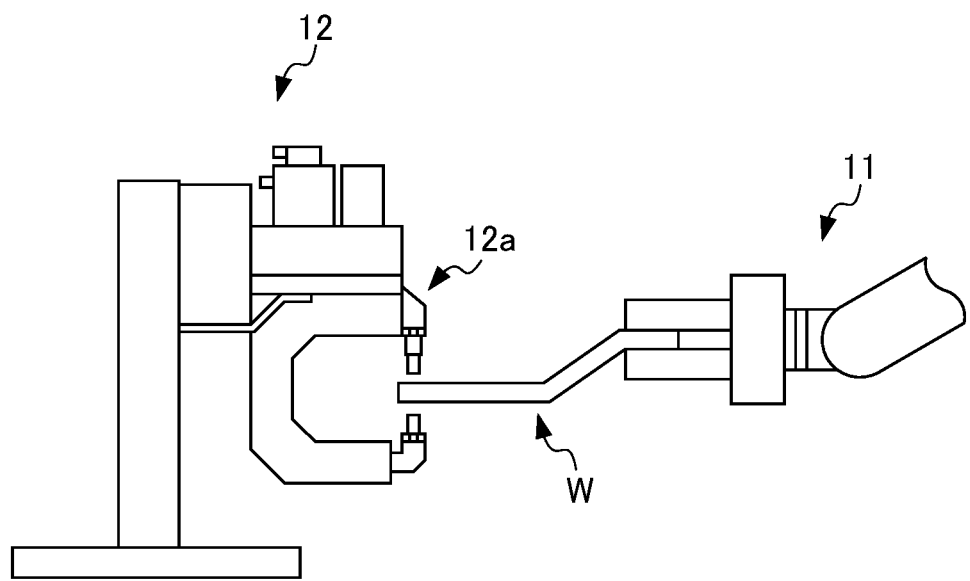
FIG. 2A schematically shows how operable units operate.
Figure 2B:
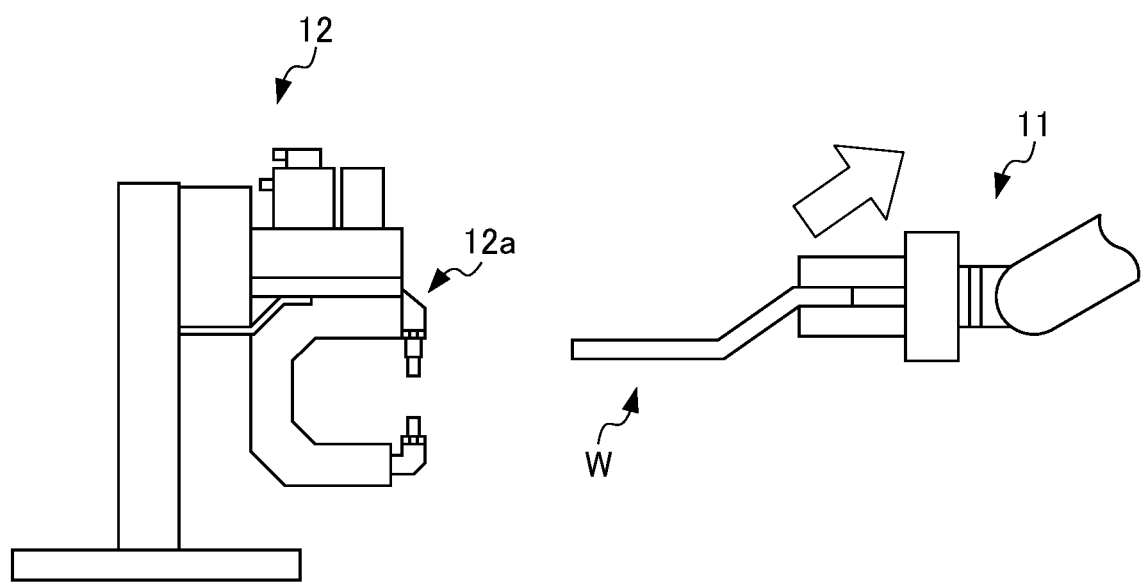
FIG. 2B schematically shows how the operable units operate.

FIGS. 2A and 2B are diagrams showing how the operable units 11 and 12 operate. As shown in FIG. 2A, the robot 11 as the operable unit grasps a workpiece W and moves to a welding position for welding by the stationary servo gun 12 as the operable unit. The stationary servo gun 12 spot welds the workpiece W at the welding position.

Thereafter, as shown in FIG. 2B, the robot 11 conveys the workpiece W to an unload position, and the stationary servo gun 12 measures the wear amount of a tip 12a. Thus, the controller 1 according to the present embodiment controls the operations of the plurality of control targets, such as the robot 11 and the stationary servo gun 12, with the help of the programs.

Figure 3:
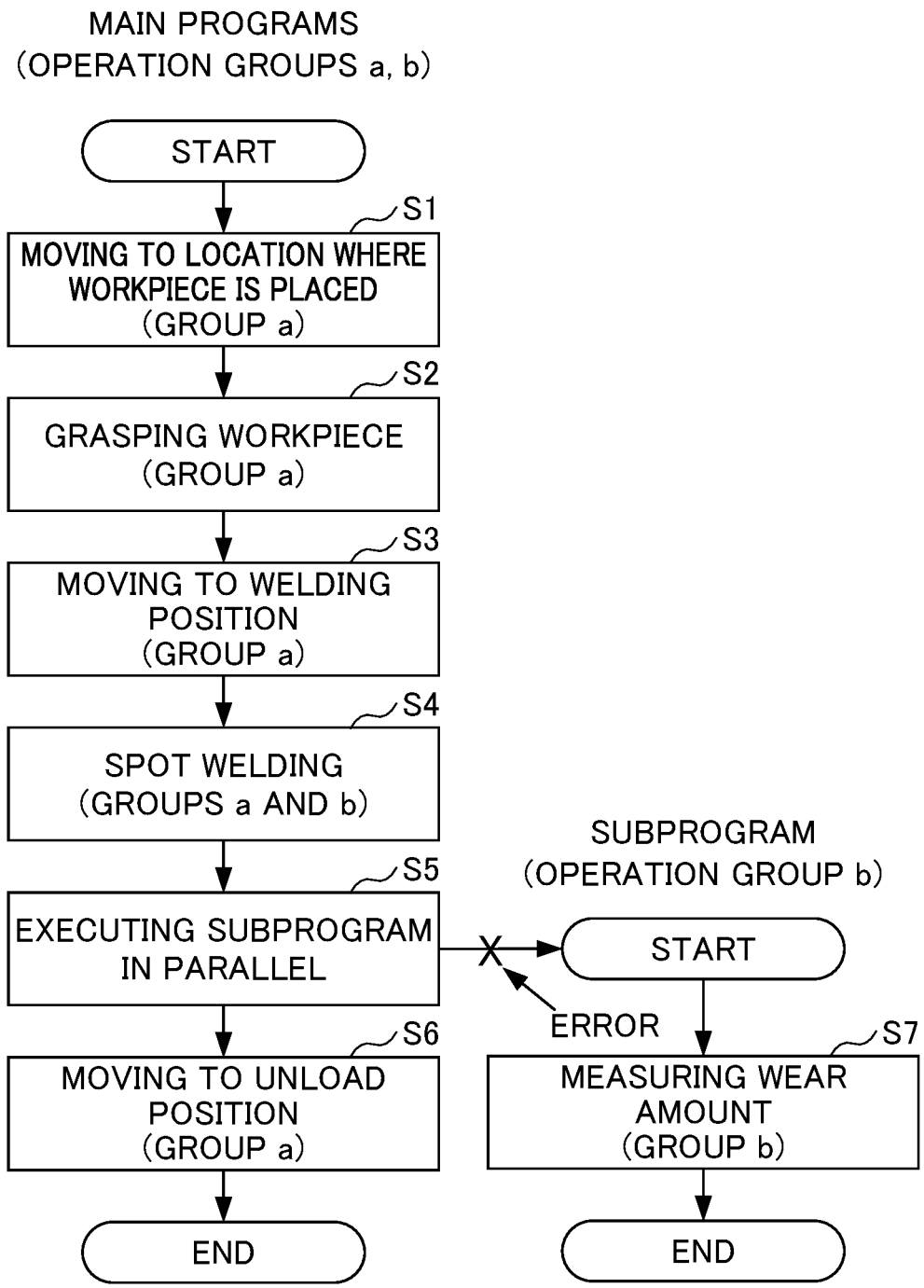
FIG. 3 is a flowchart showing processing performed by a controller.
Figure 4:
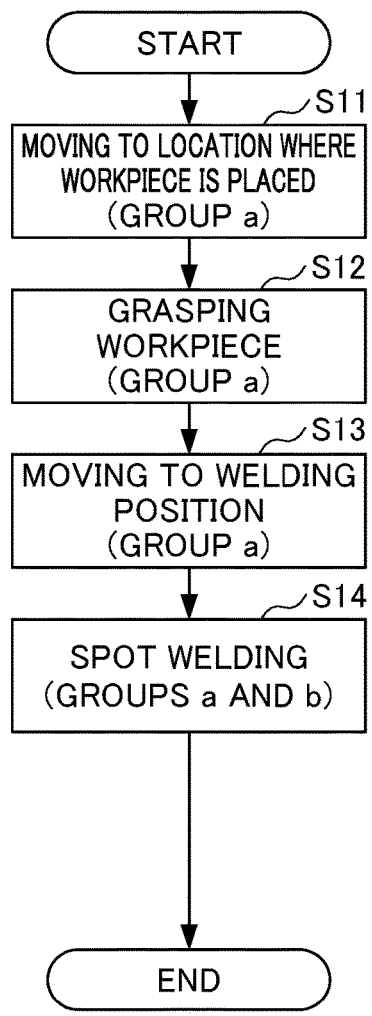
FIG. 4 is a flowchart showing processing performed by a controller.
Figure 4:
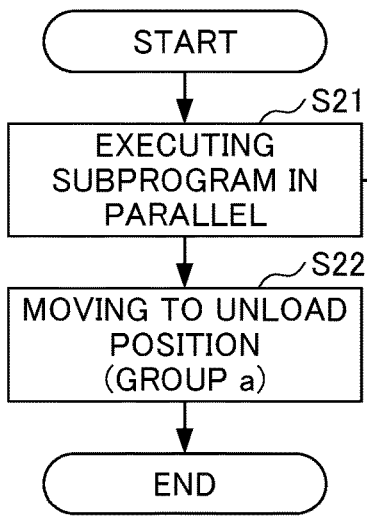
Figure 4:
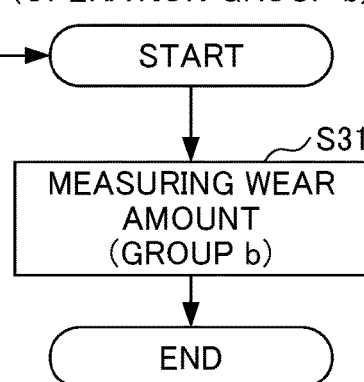
Figure 5:
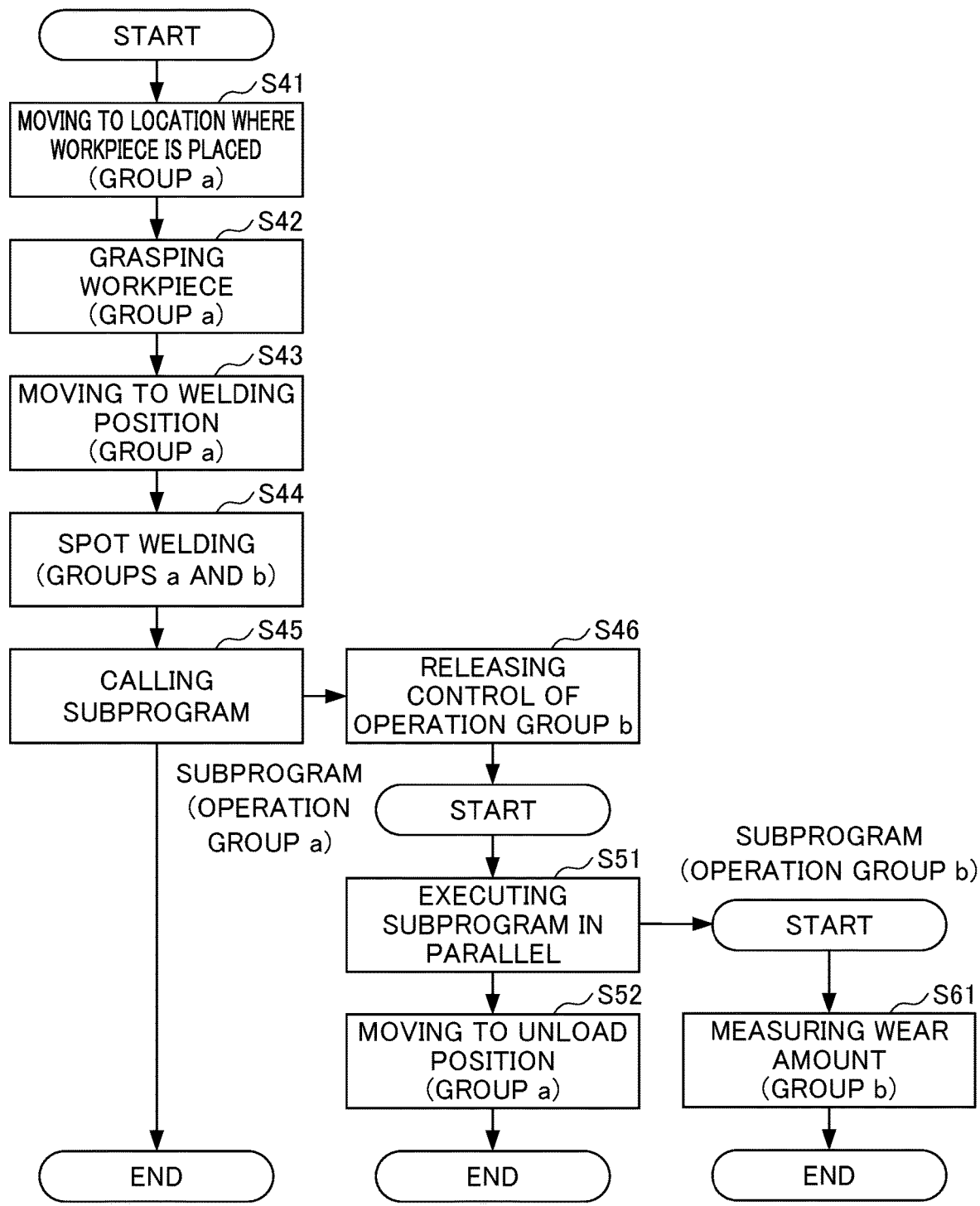
FIG. 5 is a flowchart showing processing performed by a controller.

Each of FIGS. 3 to 5 is a flowchart showing processing implemented by the respective controller 1. FIGS. 3 and 4 show conventional processing. FIG. 5 shows processing implemented by the controller 1 according to the present embodiment.

The controller 1 associates one group of operations with one operable unit. Consequently, the controller 1 no longer needs to set which one of the operable units is to be operated each time an operation command is received, simplifying the setting of the programs. Further, in this case, the program only needs to implement the processing of the specified operable unit, which contributes to a reduction of the processing costs.

However, when two or more operable units need to be operated, the controller 1 may control the operable units with one main program, while executing a subprogram in parallel for controlling one of the operable units.

In the flowchart of FIG. 3, the controller 1 controls the robot 11 and the stationary servo gun 12 with the help of a main program, while executing a subprogram in parallel for controlling the stationary servo gun 12.

Here, the controller 1 defines the robot 11 as an operation group a and the stationary servo gun 12 as an operation group b. That is, the main program is for control of the operation group a and the operation group b, while the subprogram is for control of the operation group b.

In Step S1, the program executor 131 executes the main program so that the operation executor 132 causes the robot 11 to move to a location where a workpiece W is placed.

In Step S2, the operation executor 132 causes the robot 11 to grasp the workpiece W. In Step S3, the operation executor 132 causes the robot 11 to move to the welding position.

In Step S4, the operation executor 132 causes the stationary servo gun 12 to spot weld the workpiece W, while retaining the robot 11 at the welding position.

In Step S5, the program executor 131 executes the subprogram. The program executor 131, which now executes the subprogram, causes the robot 11 to move to the unload position in Step S6, and at the same time, becomes ready to measure the wear amount of the tip 12a of the stationary servo gun 12 in Step S7.

However, since the main program and the subprogram are both going to control the operation group b, the program executor 131 cannot control the operation group b with the help of the subprogram, whereby an error occurs.

To prevent this error, the processing shown in FIG. 4 can be implemented. According to the flowchart of FIG. 4, two main programs are employed. One (main program A) of the main programs is for control of the operation group a and the other (main program B) is for control of the operation group b.

In Step S11, the program executor 131 executes the main program A so that the operation executor 132 causes the robot 11 to move to the location where a workpiece W is placed.

In Step S12, the operation executor 132 causes the robot. 11 to grasp the workpiece W. In Step S13, the operation executor 132 causes the robot 11 to move to the welding position.

In Step S14, the operation executor 132 causes the stationary servo gun 12 to spot weld the workpiece W, while retaining the robot 11 at the welding position. Thereafter, the main program A ends the processing.

Following the end of the main program A, the program executor 131 executes the main program B in parallel with a subprogram in Step S21.

In Step S22, the operation executor 132 causes the robot 11 to move to the unload position according to the main program B. In Step S31, the operation executor 132 measures the wear amount of the tip 12a of the stationary servo gun 12 according to the subprogram.

As can be seen, use of the two main programs A and B enables the controller 1 to measure the wear amount. However, since the two main programs A and B need to be designed, the program design is not intuitive and consumes much time.

FIG. 5 shows processing configured to avoid this inconvenience. According to the flowchart of FIG. 5, when calling a subprogram from a main program, the controller 1 releases control of the operation group b associated with the stationary servo gun 12 and specified in the called subprogram. The controller 1 then starts a subprogram for measuring the wear amount of the stationary servo gun 12, in a multitasking fashion.

Specifically, in Step S41, the program executor 131 executes the main program so that the operation executor 132 causes the robot 11 to move to the location where a workpiece W is placed. In this step, the operable unit manager 133 obtains control of the operation group a and control of the operation group b.

In Step S42, the operation executor 132 causes the robot 11 to grasp the workpiece W. In Step S43, the operation executor 132 causes the robot 11 to move to the welding position.

In Step S44, the operation executor 132 causes the stationary servo gun 12 to spot weld the workpiece W, while retaining the robot 11 at the welding position.

In Step S45, the program executor 131 calls a subprogram C from the main program. In Step S46, the operable unit manager 133 releases control of the operation group b.

In Step S51, the parallel executor 134 executes subprograms C and C in parallel, the subprograms C and D specifying the operation group b whose control has been released. In Step S52, the operation executor 132 causes the robot 11 to move to the unload position, according to the subprogram C.

In Step S61, the operation executor 132 measures the wear amount of the tip 12a of the stationary servo gun 12, according to the subprogram C. As can be seen, the controller 1 suitably executes the main program, the subprogram C, and the subprogram D by releasing control.

The above embodiment has been described based on the configuration in which the operable units 11 and 12 are embodied as the robot 11 and the stationary servo gun 12, respectively. However, the operable units 11 and 12 are not limited to these devices. For example, each of the operable units 11 and 12 may be at least one robot, at least one operable tool (e.g., a stationary servo gun, a stationary sealer gun, etc.), at least one rail axis, at least one positioner, or a combination thereof.

For example, in the embodiment described above, subsequent to the spot welding, the stationary servo gun 12 measures the wear amount. However, the stationary servo gun 12 may perform an exchange of servo guns (gun change), instead of the measurement of the wear amount.

Further, when the robot 11 is conveying the workpiece W to the unload position, a positioner (turn table) as a separate operable unit may convey, a workpiece W to a feeding position.

In a multi-arm system having two arms instead of the robot 11 and the stationary servo gun 12, the controller 1 may define one of the robots as the operable unit 11 and the other as the operable unit 12.

Alternatively, the operable unit 12 may be a stationary sealer gun, instead of the stationary servo gun 12. In this case, the operation executor 132 may load and pressurize the stationary sealer gun, while causing the robot 11 to move to the unload position.

Alternatively, the operable units 11 and 12 may be a robot and a rail axis of a robot system, instead of the robot 11 and the stationary servo gun 12. For example, in a robot system in which a grasp position is away from an unload position, and robots move between these positions along a rail axis, the operable units 11 and 12 may be the rail axis and the robots, respectively. In this case, when one robot is moving along the rail axis, another robot may move to the unload position.

According to the present embodiment, the controller 1 includes: the operable units 11 and 12; the program storage 141 that stores programs specifying a plurality of operations associated with the operable units 11 and 12; the program executor 131 that executes the programs; the operation executor 132 that causes the operable units 11 and 12 to operate according to the programs; and the operable unit manager 133 that manages control of the programs. When a program is called from one of the programs, the operable unit manager 133 obtains control of a group associated with the operable unit and specified in the called program, and releases control of a group other than the group associated with the operable unit and specified in the called program.

Thus, the controller 1 obtains control of the group associated with the operable unit and specified in the called program, and releases control of the group other than the group associated with the operable unit and specified in the called program. In this way, the controller 1 cash flexibly manage control of the groups associated with the operable units that operate in parallel with each other. This feature allows a user to intuitively and easily design the programs for the operable units 11 and 12 that operate in parallel with each other.

Each of the operable unit 11 and 12 may be at least one robot, at least one operable tool, at least one rail axis, at least one positioner, or a combination thereof. With this feature, the controller 1 can flexibly manage control of the groups associated with the operable units with respect to various control targets.

The controller 1 may further include a parallel executor 134 that executes a program in parallel, the program specifying the group associated with the operable unit and released by the operable unit manager 133. With this feature, the controller 1 satisfactorily execute and run the programs in parallel with each other.

One embodiment of the present invention has been described in the foregoing. However, the present invention is not limited to the embodiment described above. The effects described in the above embodiment are merely most advantageous effects exerted by the present invention. The effects of the present invention are not limited to the effects described in the above embodiment.

EXPLANATION OF REFERENCE NUMERALS

1: Controller
11: Operable Unit
12: Operable Unit
13: Control Unit
14: Storage Unit
131: Program Executor
132: Operation Executor
133: Operable Unit Manager
134: Parallel Executor
141: Program Storage

What is claimed is:

1. A controller comprising:
a processor;
at least one control target; and
a storage device,
wherein the processor is configured to:
store a main program specifying a plurality of operations associated with the at least one control target in the storage device;
execute the main program; and
cause the at least one control target to operate according to the main program, the main program including a first subprogram specifying a first group of the at least one control target and a second subprogram specifying a second group of the at least one control target,
wherein when the first subprogram is called from the main program, the processor releases, from the main program, control of the second group other than the first group that is associated with the control target and specified in the called first subprogram, and ends the main program, and
the processor controls the first group in accordance with the first subprogram and controls the second group in accordance with the second subprogram in parallel, wherein
the control target is at least one robot, at least one operable tool, at least one rail axis, at least one positioner, or a combination thereof.

2. The controller according to claim 1,
wherein the main program includes a plurality of subprograms including the first subprogram and the second subprogram,
wherein the processor comprises a sub-processor that executes the plurality of subprograms in parallel.

3. The controller according to claim 1, wherein the releasing and obtaining of the control are executed automatically.

4. A controller comprising:
a processor;
a plurality of control targets; and
a storage device,
wherein the processor is configured to:
store a main program specifying a plurality of operations of the plurality of control targets in the storage device;
execute the main program;
cause the plurality of control targets to operate according to the main program, the main program including a first subprogram specifying a first control target of the plurality of control targets and a second subprogram specifying a second control target of the plurality of control targets; and
wherein when the first program is called from the main program, the processor releases, from the main program, control of the second control target other than the first control target that performs the operation specified in the called first subprogram, and ends the main program, and
the processor controls the first control target in accordance with the first subprogram and controls the second control target in accordance with the second subprogram in parallel, wherein
the plurality of control targets are a plurality of robots, a plurality of operable tools, a plurality of rail axes, a plurality of positioners, or a combination of thereof.

5. The controller according to claim 4, wherein the releasing and obtaining of the control are executed automatically.

* * * * *